G. J. Colby,
Osier Peeler.
No 1,991. Reissued June 13, 1865.
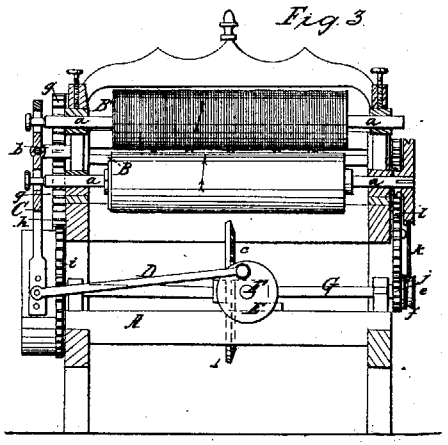
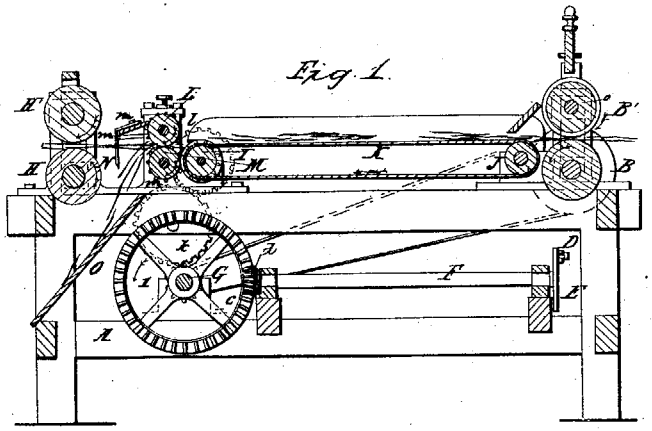
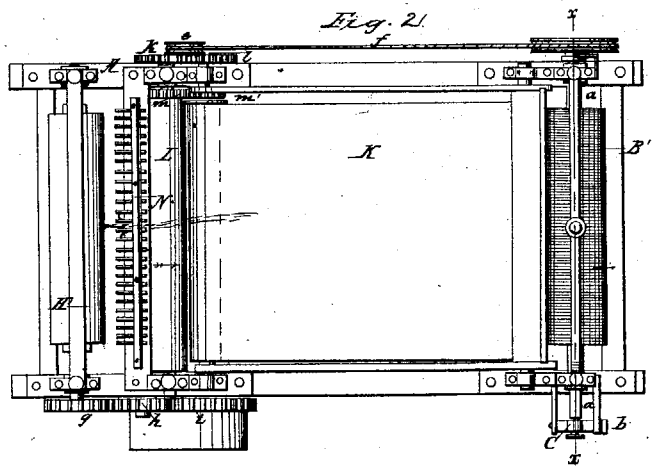
AM. PHOTO-LITHO. CO. N.Y. (OSBORNE'S PROCESS)

UNITED STATES PATENT OFFICE.

GEORGE J. COLBY, OF WATERBURY, VERMONT.

MACHINE FOR PEELING WILLOWS.

Specification forming part of Letters Patent No. 21,740, dated October 12, 1858; Reissue No. 1,991, dated June 13, 1865.

*To all whom it may concern:*

Be it known that I, GEORGE J. COLBY, of Waterbury, in the county of Washington and State of Vermont, have invented a new and useful Machine for Removing the Bark from Osiers or Willows for Making Willow-ware; I do hereby declare that the following is a full, clear, and exact description of the same, reference being had to the accompanying drawings, making a part of this specification, in which—

Figure 1 represents a side view or a longitudinal vertical section of the machine. Fig. 2 shows a plan or top view of the same. Fig. 3 is an end view or a transverse section at the line *x x*, Fig. 2.

The object of my invention is to facilitate the manufacture of baskets and other willow-ware.

My invention consists in the application and use of yielding or elastic rollers, constructed wholly or in part of vulcanized india-rubber or other elastic substances, the same being so arranged as to have a lateral motion endwise, while they rotate, to compress, rub, and wring the bark off from osiers or willows, as they are being drawn through the series of rollers hereinafter described.

To enable those skilled in the art to make and use my invention, I will describe it in detail, referring to the drawings and to the letters marked thereon.

Similar letters refer to the same parts in all of the figures.

The frame-work A may be constructed of wood or of metal, of such dimensions and form as to arrange and support the working parts of the machine.

B B′ are two rollers, supported on one end of the frame A, one above the other. The lower roller, B, may be covered with vulcanized india-rubber or other tough elastic substance. The upper roller, B′, may be made wholly or in part of metal, the surface being grooved or serrated, as shown in Figs. 2 and 3. The journals *a a* of the rollers B B′ are allowed to play longitudinally in their bearings, they being converted at one end to a lever, C, at opposite points of its fulcrum *b*, as shown in Fig. 3. The lower end of the lever C has a connecting-rod, D, to attach it to the crank-pulley E on the end of a shaft, F, which is placed longitudinally in the lower part of the frame A, and is driven by bevel-gearing *c d* from a driving-shaft, G, which is placed transversely in the lower part of the frame on a line with the shaft F. On one of the outer ends of the shaft G is placed a pulley, *e*, from which motion is communicated to the lower roller, B, by a band or belt, *f*.

H and H′ are two yielding or elastic rollers, which may be made precisely like the roller B. These rollers H H′ are placed, one over the other, in the same plane—at the other end of the frame A, opposite the rollers B B′. The shafts of the rollers H H′ are connected at one end by gear-wheels *g g*. This gearing is connected by a gear-wheel, *h*, with a cog-wheel, *i*, on the driving-shaft G. On the other end of the driving-shaft G, and adjoining the bevel-pulley *e*, is placed a cog-wheel, *j*, which, by an intermediate gear-wheel, *k*, attached to the frame, gives motion to the cog-wheel *l*, which is attached to the journal of the roller I, placed transversely on the frame, as also the corrresponding rollers J placed at the other end near the rollers B B′, which carry an endless apron, K.

L and M are two rollers of less dimensions than the rollers H H′, and are placed parallel with them directly in the rear of the roller I. The upper roller, L, is elastic, and may be made of the same material, similar to the rollers H, H′, and B′. The lower roller, M, may be rigid, made of hard wood or other suitable material. The rollers L M are connected and driven by gearing *m m′* from the roller I.

N is a rack or comb, made of wire teeth, and placed back of the rollers L M to strip off the loosened bark, which is conveyed off on the inclined board O under the rollers H H′.

To operate, the machine is put in motion by power applied to the driving shaft G. The osiers or willow rods are fed in between the rollers B and B′, which, by their end chase or alternate vibrating movements, and the serrated or grooved surface of the top roller, B′, the bark is cut, crushed, rubbed, and thoroughly loosened on the rods as they pass between the serrated and elastic rollers onto the endless apron K, and are conducted between the rollers L and M, the loosened bark being separated from the rods as they are forced or drawn through the bark or comb N, the bark being conducted off on the inclined board O, underneath the fast or speed rollers H H′, which discharge the stripped or peeled willow rods with great facility, in the most perfect manner.

Having thus fully described my invention, what I claim as new, and desire to secure by Letters Patent, is—

1. The application of vulcanized india-rubber or other yielding elastic substances for rollers, to admit various sizes of osiers or willow rods to be drawn in between, rubbed, and wrung, to loosen the bark for peeling and discharge the rods, as herein specified.

2. The serrated metal roller B′, in connection with an elastic or yielding roller B′, they both having end chase or a lateral vibrating motion to mangle and rub rods for peeling, without crushing them, for the manufacture of willow-ware.

3. The rack or comb N for separating the loosened bark from the rods, in combination with the feed-rollers L M and the faster speed-rollers H H′, for discharging the peeled rods, as herein set forth.

GEO. J. COLBY.

Witnesses:
JOHN S. HOLLINGSHEAD,
WM. C. BOTSFORD.